United States Patent [19]

Monnier et al.

[11] Patent Number: 4,468,666
[45] Date of Patent: Aug. 28, 1984

[54] APPARATUS FOR DETERMINING A REFERENCE POSITION OF A MOVING MEMBER

[75] Inventors: Jean-Luc Monnier, Neuchatel; Francis Robert, Chezard, both of Switzerland

[73] Assignee: Microbo, S.A., Switzerland

[21] Appl. No.: 309,263

[22] Filed: Oct. 7, 1981

[30] Foreign Application Priority Data

Oct. 10, 1980 [CH] Switzerland ............ 7569/80

[51] Int. Cl.³ ............................................. G08C 19/16
[52] U.S. Cl. ......................... 340/870.29; 250/231 SE; 340/870.28
[58] Field of Search ............... 250/231 SE, 232, 233; 324/207, 208; 340/870.29, 870.28

[56] References Cited

U.S. PATENT DOCUMENTS

| 3,749,925 | 7/1973 | Hertrich | 250/231 SE |
| 3,818,224 | 6/1974 | Schmidt | 250/231 SE |
| 3,922,654 | 11/1975 | Hobson, Jr. | 340/870.29 |
| 4,109,389 | 8/1978 | Balcom et al. | 340/870.29 |
| 4,263,506 | 4/1981 | Epstein | 250/231 SE |

FOREIGN PATENT DOCUMENTS 1206592 9/1970 United Kingdom .
2001169 1/1979 United Kingdom .

Primary Examiner—Gerald L. Brigance
Attorney, Agent, or Firm—Allegretti, Newitt, Witcoff & McAndrews, Ltd.

[57] ABSTRACT

The apparatus comprises a first marking element rigid with a disk rotationally driven in synchronism with the translation movement of the member and a detector which delivers an electrical signal upon the passage of the marking. The disk makes many complete rotations for the complete stroke of the member. A second marking element is rigid with the member and a second detecting device delivers an electrical signal upon the passage of the marking in front of the detector. The logic circuit C processes these two electrical signals so as to produce a signal 10 which gives the instant when the moving member passes through the reference position.

4 Claims, 5 Drawing Figures

APPARATUS FOR DETERMINING A REFERENCE POSITION OF A MOVING MEMBER

BACKGROUND OF THE INVENTION

The present invention relates to an apparatus for determining a reference position of a movable member. The apparatus is adapted to deliver a logical electrical signal when the member passes through the reference positions.

The invention is applicable particularly, but not exclusively, to the case of a robot arm constituted by several sections which are movable with respect to each other and of which the end section carries a tool, the arm being controlled by a computer. It is applicable more especially to the case where the data concerning the displacements of the sections of the arm delivered by incremental transducers which deliver one electrical pulse each time an increment of movement is effected. It is clear that, if the incremental transducers are capable of so delivering displacement data, they cannot provide positional data without a reference position which defines the origin of the displacement.

The present invention makes it possible to provide an electrical signal which furnishes this reference position in a form that is easily compatible with the incremental displacement signals.

PRIOR ART

In the case of linear displacements, one known solution for producing such a signal consists in defining the reference position by means of a stationary electrical contact which is actuated when a part of the movable member reaches the contact. Such a limit switch system has numerous disadvantages. It does not enable a high degree of precision to be obtained in the definition of the reference position. Moreover, this position is liable to become altered in the course of use. There is also a problem of synchronism between this mechanical reference contact and the optical-mechanical system that defines the various increments.

SUMMARY OF THE INVENTION

According to the present invention there is provided apparatus for determining the reference position of a movable member. The apparatus comprises a first position-determining unit including means for imparting to a first marking element a rotary movement corresponding to the movement of the said member and a first detecting device for delivering a first electrical signal at the moment when the marking element passes in front of the detecting device. A second position-determining unit includes a second marking element and a second detecting device actuated by a relative movement with respect to the second marking element and corresponding to the movement of the second member. The second detecting device is rigid with the said member and the second marking element is stationary in relation to the movement of the said member or vice versa. The second detecting device produces a second electrical signals so as to produce a signal representative of the passage of the said member through the reference position.

In the preferred arrangement the movable member undergoes a translational movement and the first marking element undergoes a plurality of complete rotations for one stroke of the said member. There is thus a first so-called "fine" position-determining unit, a second so-called "coarse" position-determining unit and means for processing the electrical signal delivered by each unit so as to deliver a signal which is representative of the passage of the member through the reference position. The first position-determining unit includes the means for imparting to a first marking a rotary movement corresponding to the translational movement of the member and a stationary detecting device for detecting the passage of the first marking and which delivers an electrical signal at the moment when this passage takes place.

For example, this illustrative embodiment comprises a light source and a light collector, the beam emitted by the source being periodically interrupted by the marking and the beam received by the collector being therefore modulated. The collector delivers a first electrical signal, the amplitude of which is representative of the intensity of the light beam. The second unit includes a second marking which is rigid with the member and a second detecting device which detects the passage of the second marking and emits an electrical signal at the moment when this passage occurs, the second detecting device being stationary. An electronic circuit processes the signals delivered by the detecting devices in order to detect, for example, the moment when the first marking passes in front of the first device for the first time, after the second marking has itself passed in front of the second detecting device.

In a variant, the second marking could be stationary and the second detecting device rigid with the member.

It is therefore one object of the present invention to provide an apparatus for determining the reference position of a member which does not rely only on mechanical engagement.

It is another object to provide such apparatus which is easy to synchronize with incremental signals relating to the displacement of the member.

It is a further object to provide a very high degree of precision for the reference position and to define a reference position which will be strictly constant for a long period of time.

Other objects and advantages of the invention will be apparent from the following detailed description of a preferred embodiment given by way of non-limiting example.

DETAILED DESCRIPTION OF THE PREFERRED EMBODIMENT

Figure 1:
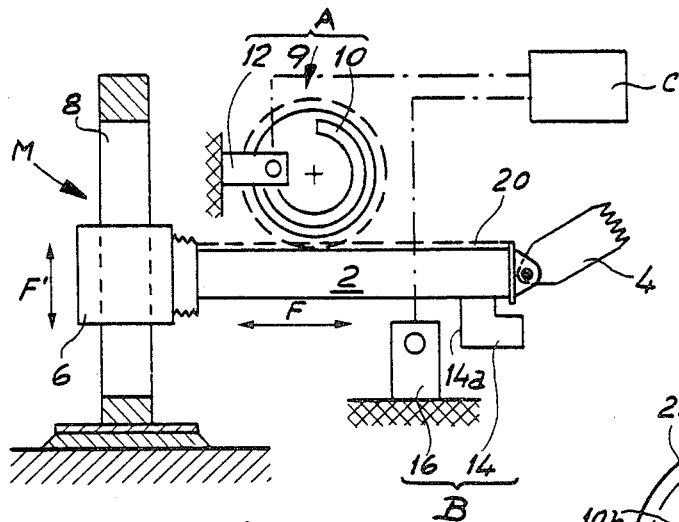
FIG. 1 is an elevational view of an apparatus embodying the invention mounted on a movable member undergoing translational movements.
Figure 2B:
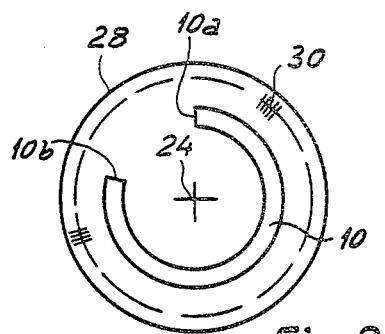
FIG. 2b shows a disk which carries a first marking.
Figure 2A:
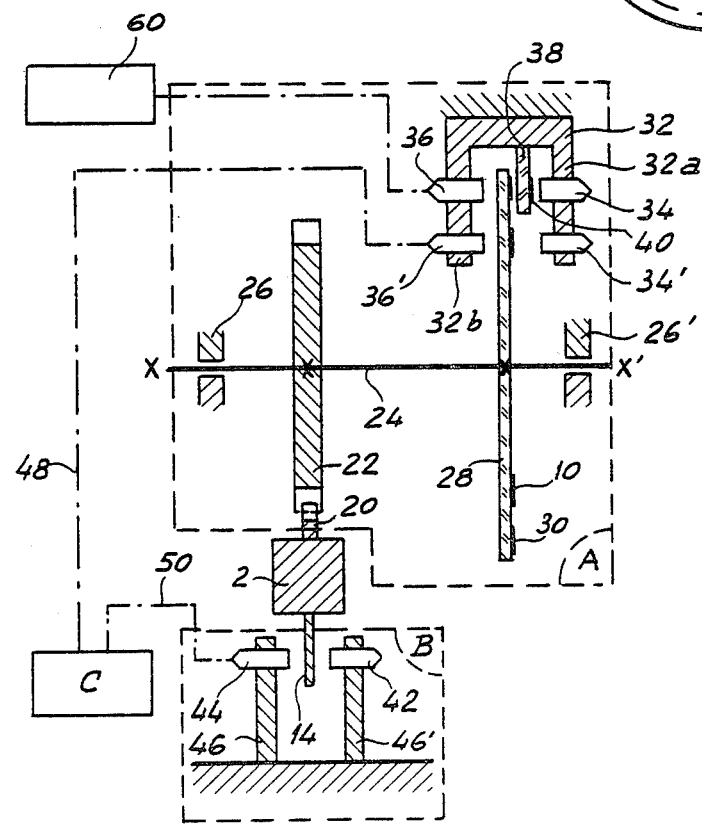
FIG. 2a is a vertical section of the device shown in FIG. 1.

FIGS. 1, 2a and 2b show the overall apparatus for determining the reference position of a movable member undergoing translational movement. In the example under consideration, the movable member 2 undergoing translational movement forms a section of a robot arm M, the arrow F indicating the translational movement. FIG. 1 shows diagrammatically a second arm section 4 which is pivotally connected to the end of the part 2 and a member 6 in which the arm section 2 is slidable under the action of an actuator (not shown). The member 6 itself is, for example, vertically movable with respect to a bracket 8, as indicated by arrow F'. The description is concerned with the definition of a reference or zero position for the member 2 in its translational displacement.

The apparatus includes a "fine" position-determining unit bearing the general reference A, a "coarse" position-determining unit B and a circuit C for processing electrical signals delivered by the units A and B.

The unit A comprises essentially means 9 for imparting to a marking 10 a rotational movement corresponding to the translational movement of the member 2 and a detecting device 12 which is adapted to emit an electrical signal of different level according to whether the marking 10 is or is not in front of it. The unit B comprises essentially a marking 14 which is rigid with the member 2 and a second detecting device 12 which is adapted to emit an electrical signal of different level according to whether the marking 14 is or is not in front of the detecting device 16.

FIG. 1 has no regard to the scale of the various different parts of the position-determining apparatus. In particular, the radius of the disk forming part of the means 9 has been considerably increased as compared with that which it would have had if the disk had been drawn to the same scale as the member 2. The relative scales are in fact such that, when the member 2 traverses the whole of its path of movement, the disk makes a large number n of revolutions. The signal delivered by the detecting device 12 therefore exhibits a series of peaks corresponding to the successive passages of the marking 10 in front of the detecting device 12. This device accordingly provides an accurate determination of position, but it is related to an unspecified one of n revolutions of the disk. On the other hand, the edge 14a of the mark 14 passes only once in front of the detecting device 16, but in doing so provides a not very accurate but single determination with the accurate but periodic determination, whereby a single and accurate overall determination is obtained.

FIGS. 2a and 2b enable the invention to be better understood. These figures show the position-determining units A and B in greater detail. As can best be seen in these figures, the member 2 is provided on its upper surface with a row of teeth 20 which is in mesh with a toothed wheel 22. This wheel 22 is keyed on a shaft 24 extending, along an axis XX, this shaft being rotatably mounted in bearings 26 and 26'. These bearings 26 and 26' are stationary if only translational movement of the member 2 occurs, that is to say if the member 6 is stationary. If, on the contrary, the member 6 is movable in accordance with the vertical translational movement indicated by the arrow F', the bearings 26 and 26' must be rigid with member 6. Also keyed on the shaft 24 is a transparent disk 28 which is better known in FIG. 2b. It is this disk 28 which carries the marking 10. This marking 10, which has, for example, the form of a part of an annulus is applied to the disk 28 with an opaque material. According to the direction of rotation of the disk 28, the marking 10 has a beginning 10a and an end 10b. This disk also has a ring of uniformly spaced graduations 30, the purpose of which will be described later.

It follows from the preceding description that the marking 10 is moved about the axis XX', in a movement which corresponds to the translational movement of the member 2, thanks to the cooperation of the rack teeth 20 with the toothed wheel 22 and to the rigid connection provided by the shaft 24 between the disk 28 and the wheel 22. This unit accordingly constitutes the means 9 for converting the translational movement into a rotary movement.

The unit A also includes the detecting device 12 of FIG. 1. The device 12 comprises a supporting yoke 32 which embraces the periphery of the disk 28 and which is stationary with respect to the translational movement of the member 2. More generally, the support 32 is rigid with the same part as the bearing supports 26 and 26'. Fixed to one of the arms 32a of the support 32 are two light sources 34 and 34' located respectively opposite the ring of graduations 30 and opposite the arcuate length of the marking 10. Fixed to the other arm 32b are two light detectors 36 and 36', the axes of which are coincident with those of the light sources 34 and 34'. Furthermore, an annular portion 38 is fixed to the support 32 in such a manner that this annular portion is interposed between the disk 28 and the light source 34. This annular portion 38 is provided with graduations 40 the spacing of which is exactly the same as that of the graduations 30 of the disk 28.

When the disk 28 rotates, that is to say when the member 2 is displaced, the light beam emitted by the source 34' is received by the light detector 36' so long as the marking 10 is not interposed between the source 34' and the detector 36'. On the contrary, the detector 36' receives no light when the marking 10 is interposed between the source 34' and the detector 36'. The light beam is modulated by the displacement of the marking 10.

The light sources 34 and 34' are advantageously incandescent lamps or light-emitting diodes. As for the detectors 36 and 36', they may be photo-transistors, photo-diodes, photo-resistances or other transducers which deliver an electrical signal the amplitude of which depends upon the intensity of the light which they receive.

The recording unit B includes the single marking 14, which is rigid with the member 2 and opaque, and the detecting device 16. The detecting device 16 includes a light emitter 42 which is identical with the emitters 34 and 34' and a detector 44 which is identical with the collectors 36 and 36'. The elements 42 and 44 are mounted on supports 46, 46' which are stationary in relation to the exclusively translational movement of the member 2, that is to say these supports are rigid with the same member as the support 32 and the bearing supports 26 and 26'. The elements 42 and 44 ae disposed in such a manner that their axes are coincident and perpendicular to the path of movement of the marking 14. It is clear that the electrical signal delivered by the collector 44 has a minimum value when the marking 14 intersects the light beam emitted by the source 42 and has a maximum value during the rest of the time.

Figure 3:
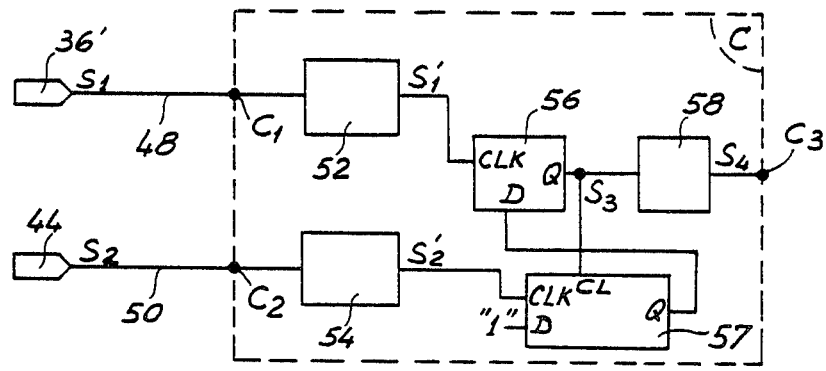
FIG. 3 shows a simplified arrangement of the circuit for processing electrical signals.
Figure 4:
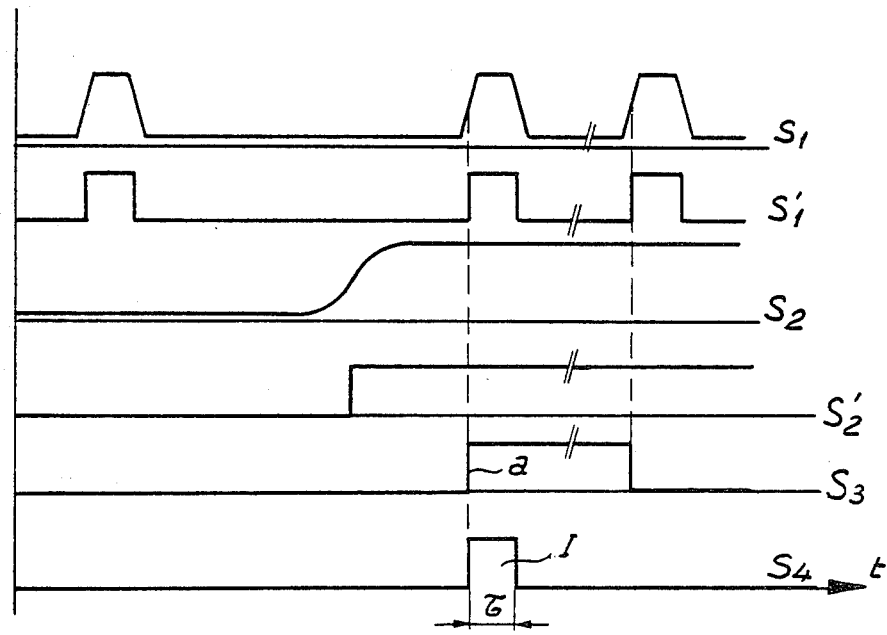
FIG. 4 shows time diagrams of the signals of the circuit shown in FIG. 3.

The electrical signals delivered by the detectors 36' and 44 are processed in the circuit C, one possible arrangement of which is shown in FIG. 3. Electrical conductors 48 and 50 connect the outputs of the detectors to the inputs of the circuit C.

The inputs $C_1$ and $C_2$ of the ciruit C are connected respectively to the shaping circuits 52 and 54. These circuits, which are for example threshold circuits, deliver logical signals $S'_1$ and $S'_2$ from the signals $S_1$ and $S_2$ delivered by the collectors 36' and 44. The signals $S'_1$ has logical level zero when the marking 10 intercepts the light beam, while the signal $S'_2$ has the logical level zero when the marking 14 intercepts the light beam. The signal $S'_1$ is applied to the clock input of a D-type flip-flop 56, while the signal $S'_2$ is applied to the clock input of a second D-type flip-flop 57. The output of the flip-flop 56 is connected to the clear input CL of the flip-flop 57, while the output of the flip-flop 57 is connected to the D input of the flip-flop 56. In addition, the D input of the flip-flop 57 is maintained at the logical level 1.

When the rising edge of signal $S'_2$ appears, the output Q of the flip-flop 57 changes to 1. The rising edge of the first following pulse of the signals $S'_1$ sets the output Q of the flip-flop 56 to 1. The flip-flop 56 accordingly delivers at its output Q a logical signal $S_3$ having a rising edge a which coincides with the first rising edge of the signal $S'_1$ appearing after the rising edge of the signal $S'_2$. The signal $S_3$ is applied to the input of a monostable 58 having a time constant and to the clear input of the flip-flop 57. The flip-flop 57 therefore is reset to zero and remains so until a new rising edge of signal $S'_2$ appears. The monostable 58 delivers at its output the signal $S_4$ which is applied to the output $C_3$ of the circuit C. The signal $S_4$ produces a pulse I of duration $\tau$ which constitutes the signal of the reference position of the member 2 during the translational movement of the latter. In addition, since the input D of the flip-flop 57 is at zero, the signal $S_3$ becomes zero when the next pulse of the signal $S'_1$ appears.

It is clearly apparent that the rising edge of the pulse I of the signal $S_4$ coincides with the movement when, for the first time, the beginning 10a of the marking 10 intercepts the light beam emitted by the source 34' after the leading edge 14a of the marking 14 has crossed the light beam emitted by the source 42, while the member 2 is being displaced from left to right. It is clear that, on the other hand, if the member 2 is displaced from right to left, this same situation will not give rise to any pulse of the signal $S_4$ which will remain at zero. In fact, starting from a situation in which the signal $S_2$ is at 1, the change-over of this signal to zero will apply no pulse to the clock input of the flip-flop 57 and the output of this flip-flop will remain at zero. Consequently, the D input of the flip-flop 56 remains at zero and the signal $S_3$ therefore remains at zero when pulses of the signal $S'_1$ are applied to its clock input. A very precise and perfectly reproducible geometrical definition of the reference position or of zero results from this.

It must be added that the definition of the signal $S_3$, $S_4$ from the signals $S'_1$ and $S'_2$ could be effected differently. It is easy to understand that the only stipulation is what this definition must always be the same.

It must also be made clear that the disk 28 may have a radius considerably longer than that of the toothed wheel 22. As a result, the accuracy of definition of the passage of the beginning 10a of the marking 10 in front of the light source can be improved by a factor equal to the ratio of the radius of the disk 28 to that of the toothed wheel 22. Moreover, it is clear that the optical device 16 could be rigid with the member 2, the marking 14 then being stationary. It is easy to understood that it is in fact sufficient that the marking 14 and the source 42-collector 44 unit should have a relative displacement corresponding to the translational displacement of the member 2.

The support 32 also has the annular portion 38 provided with graduations 40 and the light source 34 associated with the detector 36, the function of which will now be explained. These elements, which associated with the graduations 30 provided on the disk 28, serve for detecting displacements of the member 2 by the 'moire' principal. This technique is well-known and it is not therefore necessary to describe it in detail. The grating composed of the graduations 30 provided on the disk 28 and the grating composed of the graduations 40 provided on the annular portion 38 are interposed between the light source 34 and the detector 36. In addition, the graduations 30 and 40 have a line width equal to the distance separating two consecutive graduations. As the disk 28 rotates, the graduations 30 are alternatively in register with the graduations 40, at which time the light intensity received by the detector has a maximum value and exactly out of register with the graduations 30, at which time the detector 36 receives no light or practically none. In between, the overlap of graduations varies progressively. The electrical signal delivered by the collector 36 thus exhibits a succession of maxima separated by time intervals corresponding to the time taken by the disk to rotate through the angle separating one graduation from the next graduation. After processing in a circuit 60, (FIG. 2a) there is obtained an incremental logical signal, each pulse of which corresponds to a displacement of the disk, and hence of the member 2, by one step.

Consequently, by combining the incremental displacement signal delivered by the circuit 60 with the reference position signal $S_4$ delivered by the circuit C, it is possible to determine any position whatever of the member 2. In addition, it is clearly evident that, since the beginning 10a of the marking is applied on the same disk 28 as the displacement indicating graduations 30, it is easy to synchronize the referencce or zero position with the displacement data. Moreover, it is apparent that the reference position is ultimately defined by the marking 10, which enables the effect of possible variations in the position of the marking 14 to be eliminated, provided that these variations are smaller than a displacement of the member 2 corresponding to one half-revolution of the disk 28.

Finally, according to a known technique, it is possible, by adding a second grating composed of graduations 40 which are offset by a quarter of a step, to determine in addition the direction of displacement of the member 2. It is thus possible to ensure that, during the passage through zero, it is in fact the edge 14a which has intercepted the light beam.

It should be added that the optical detectors and the light sources could be replaced by other devices for detecting the passage of the marking. For the position-determining device A, it is necessary that the detection should be effected with very great precision. Capacitative, inductive or magnetic detectors could be used. Obviously, the marking 10 then has a particular form suited to the type of detectors employed.

As for the position-determining device B, it can make use of the same type of detecting device as the position-determining device A. However, since a less accurate detection of the passage of the marking is sufficient, an electrical limit switch could even be used. Indeed, it has already been explained that it is the position-determining device A which provides the accuracy of the overall definition of the reference position.

Obviously, instead of the member 2 undergoing a translational movement one can use a movable member undergoing a movement of other type, for example, a rotational movement.

It is apparent that modifications and changes may be made in the operation and structure of the invention as described above without departing from the scope of the invention. The description has been made only by way of example, and is not to be taken as limiting the invention.

What is claimed is:

1. Apparatus for determining a reference position for a movable member to enable the displacement of the movable member from the reference position to be measured comprising
   (a) an elongated movable member adapted for translational movement in a forward or reverse direction,
   (b) a first position-determining unit in driven engagement with said movable member, the first positioning-determining unit comprising a first rotatable member having a first marking element, the translational movement of said movable member imparting to said first rotatable member a rotary movement corresponding to the translational movement of said movable member, and a first detecting device for producing a first electrical signal representing the instant when said first marking element passes in front of said first detecting device,
   (c) a second position-determining unit mounted to respond to the translational movement of said elongated movable member, the second position-determining unit comprising a second marking element and a second detecting device movable relative to each other in response to the translational movement of said elongated movable member, one of said second marking element and said second detecting device having translational movement corresponding to the translational movement of said movable member and the other of said second marking element and said second detecting device being stationary in relation to said movable member,
   (d) said second detecting device producing a second electrical signal representing the instant when said second marking element passes in front of said second detecting device, and
   (e) an electrical logic circuit connected to receive said first and second position electrical signals to produce a signal representative of the instant when one of said marking elements passes its detecting device after the other marking element has passed its detecting device to thereby indicate passage of the elongated movable member through the reference position.

2. Apparatus according to claim 1, comprising means for imparting a rotary movement to the first marking element including a row of rack teeth rigid with said movable member, a toothed wheel meshing with the row of rack teeth and mounted for rotation about an axis which is stationary in relation to movement of the said movable member, and a disk fixed for rotation with said toothed wheel, said disk bearing said first marking element.

3. Apparatus according to claim 2, wherein said disk is transparent and said first marking element is an opaque area thereon.

4. Apparatus according to claim 3, wherein said transparent disk also comprises a ring of uniformly distributed graduations and comprising a stationary grating provided with a series of graduations identical with those of said transparent disk, an optical device comprising a light source and a detector disposed one on each side of the assembly formed by said disk and said stationary grating, for delivering an electrical signal representative of the passage of the graduations in front of the optical device, and a circuit for processing the electrical signal provided by said optical device so as to produce a logical signal comprising one pulse for each passage of a graduation.

* * * * *